United States Patent [19]
Tellert

[11] Patent Number: 4,509,625
[45] Date of Patent: Apr. 9, 1985

[54] AUTOMATIC FRICTION CLUTCHES AND CONTROLS THEREFOR

[75] Inventor: Rudy Tellert, Schweinfurt, Fed. Rep. of Germany

[73] Assignee: Sachs-Systemtechnik GmbH, Schweinfurt, Fed. Rep. of Germany

[21] Appl. No.: 285,548

[22] Filed: Jul. 21, 1981

[30] Foreign Application Priority Data

Jul. 25, 1980 [DE] Fed. Rep. of Germany ....... 3028250
Nov. 17, 1980 [DE] Fed. Rep. of Germany ....... 3043347
Nov. 17, 1980 [DE] Fed. Rep. of Germany ....... 3043348
Apr. 24, 1981 [DE] Fed. Rep. of Germany ....... 3116455

[51] Int. Cl.³ ............................................. F16D 25/12
[52] U.S. Cl. ............................... 192/0.033; 192/0.052; 192/0.076; 192/0.03 R
[58] Field of Search ................ 192/0.033, 0.052, 0.07, 192/0.075, 0.076, 3.58, 103 R, 0.032; 74/866; 361/242

[56] References Cited

U.S. PATENT DOCUMENTS

| | | | |
|---|---|---|---|
| 2,924,313 | 2/1960 | Binder et al. | 192/0.033 |
| 2,990,927 | 7/1961 | Steadman | 192/0.076 |
| 4,019,614 | 4/1977 | Prenzel et al. | 192/3.58 |
| 4,023,660 | 5/1977 | Dickinson | 192/0.075 |
| 4,081,065 | 3/1978 | Smyth et al. | 192/0.076 |
| 4,208,929 | 6/1980 | Heino et al. | 74/866 |
| 4,295,551 | 10/1981 | Zimmermann et al. | 192/0.076 |
| 4,331,226 | 5/1982 | Heidemeyer et al. | 192/0.076 |
| 4,343,387 | 8/1982 | Hofbauer | 192/0.076 |

FOREIGN PATENT DOCUMENTS

| | | |
|---|---|---|
| 2172622 | 9/1973 | France. |
| 2374177 | 7/1978 | France. |
| 990115 | 4/1965 | United Kingdom. |
| 1008074 | 10/1965 | United Kingdom. |
| 1028964 | 5/1966 | United Kingdom. |
| 1083890 | 9/1967 | United Kingdom. |
| 1089751 | 11/1967 | United Kingdom. |
| 1120132 | 7/1968 | United Kingdom. |
| 1154327 | 6/1969 | United Kingdom. |
| 1154328 | 6/1969 | United Kingdom. |
| 1165755 | 10/1969 | United Kingdom. |
| 1427309 | 3/1976 | United Kingdom. |
| 1532266 | 11/1978 | United Kingdom. |
| 2012892 | 8/1979 | United Kingdom. |
| 1559719 | 1/1980 | United Kingdom. |

*Primary Examiner*—George H. Krizmanich
*Attorney, Agent, or Firm*—Toren, McGeady and Stanger

[57] ABSTRACT

A controllable drive device moves an actuator of a motor vehicle friction clutch between a disengaged position and an engaged position. The drive device adjusts the position of the actuator in the slippage area of the clutch between a position at which torque conversion begins and the engaged position in response to a program control that operates on the basis of an engine's rotating speed and controls the drive device according to a characteristic determined by an engine's speed dependent function generator.

22 Claims, 13 Drawing Figures

AUTOMATIC FRICTION CLUTCHES AND CONTROLS THEREFOR

BACKGROUND OF THE INVENTION

This invention relates to motor vehicle friction clutches and, particularly, to devices which operate friction clutches automatically by means of a controllable drive that moves an actuator between engaged and disengaged positions.

Automatic motor vehicle gear shifts customarily employ torque converters which require large investment in equipment and, hence, are relatively expensive. To reduce structural expenditures, attempts have been made to operate conventional motor vehicle friction clutches with centrifugal force switches that engage the clutch above idling speeds. Such clutches have proven to offer only limited capability because the rotating speed/dependent engagement characteristic of the centrifugal force switch adjusts to the rotary speed torque characteristic of the motor only with great difficulty. To make starting on a hill possible, the engagement point of the centrifugal switch must be set in the region of maximum torque, and, thus, at a relatively high engine speed. Consequently, a system using such a device must start at relatively high engine speeds even on level ground. This is bothersome, particularly when maneuvering the vehicle back and forth.

An object of the invention is to improve automatic motor vehicle friction clutches and the controls therefor.

Another object of the invention is to avoid the aforementioned difficulties.

Still another object of the invention is to adapt the engagement behavior of a conventional automatic motor vehicle friction clutch to a wide gamut of driving situations.

Yet another object of the invention is to achieve the above in an uncomplicated manner.

SUMMARY OF THE INVENTION

According to a feature of the invention, the position of a clutch actuator is adjusted through a slippage region between the beginning of torque conversion and the engaged position by an engine speed responsive control which regulates the actuator according to a characteristic set by an engine speed dependent function generator.

According to another feature of the invention, the engagement characteristic is adjusted to the requirements of the particular friction clutch.

According to another feature of the invention, the function generator is in the form of a read only memory (ROM) whose stored data can be read in dependence upon the engine rotary speed.

According to another feature of the invention, the read only memory serves several functions depending upon one or more further operating parameters of the engine or the vehicle's driving situation.

According to yet another feature of the invention, a microprocessor directs the functions of the read only memory.

According to yet another feature of the invention, function generators composed of discrete components generate transform functions according to given position characteristics. Setting and adjusting the parameters of such circuits permits adaptation of particular driving situations.

According to yet another feature of the invention, the actuator responds to manual shift operation as well as servo-controls.

According to yet another feature of the invention, the engaged position of the clutch is variable in dependence upon the setting of an adjustment member which, in turn, influences the motor torque. This feature is based upon the recognition that the torque applied by the engine depends upon both the engine's rotary speed and the setting of an adjustment member, such as a gas pedal, choke valve, or regulating member of a fuel injection pump. Furthermore, the engaged position of friction clutches, that is, the position of the actuator or actuating member at which the clutch just stops slipping is also dependent upon the motor torque.

Particularly, according to this feature, the engaged position is changed as the torque increases with increased engine speed. In this manner, engagement occurs during back and forth maneuvering of the vehicle or during the usual starting operation at low rotating speeds and with little gas. At full throttle, the engaged position occurs only at high rotating speeds during which maximum engine torques customarily occur.

According to another feature of the invention, each engaged position is assigned in dependence upon the setting of the adjusting member to the engine speed at which maximum torque for this setting of the setting member arises. This optimizes the engagement operation.

A substantial drawback of motor vehicle clutches activated by centrifugal force is that the engagement rotating speed is fixed and cannot be exceeded during starting. The engagement rotating speed must therefore coincide with the engine speed at which maximum engine torque is achieved. During back and forth maneuvering, one must drive with unnecessarily high engine speeds. According to a feature of the invention, this drawback is avoided when the control sets the drive to the position determined by the function generator with a predetermined time delay. If the driver then applies only a little gas, for instance, during back and forth maneuvering of the vehicle, then the engine speed increases slowly during the predetermined time delay so that the control can set the position of the actuating member according to the characteristic determined by the function generator. However, because of the predetermined time delay, an operator can also start at full throttle and high engine speeds because the predetermined time delay is sufficient for acceleration of the engine until the control engages the clutch. In a simple embodiment, this engagement behavior is achieved by setting off the engagement operating sequence of the control via an engine speed responsive threshold stage when the engine surpasses a predetermined speed threshold and by having a delay stage delay the beginning of the engagement operation sequence a predetermined time interval relative to the setoff time of the threshold stage. The output signal of the control thus does not follow the sudden rotary speed change but approaches the changed rotational speed value through a time delay following an exponential function.

In a vehicle with multi-gear transmissions, according to an aspect of the invention, the control (or engagement control) preferably responds to the gear setting of the transmission. The engine speed dependent characteristic of the position of the actuating member or actuator can be determined in dependence upon the gear setting. This makes it possible for the arrangement to take into account normally differing driving situations at individual gears. Normally, two different function programs or operating characteristics produced by function generators are sufficient. One of the functions is adapted to the starting behavior of the vehicle in first gear or in reverse gear, while the second controls the gear change of the higher gears during the driving operation.

According to another feature of the invention, during starting, a first function producer in the generator achieves a practical engagement when the control changes the engagement position and/or the position of the actuating member in the slippage area of the clutch substantially proportional to the engine speed. According to an embodiment of the invention, such a characteristic is established by analog circuit techniques, for instance, with the use of integrators. According to an embodiment of the invention, a second producer in the function generator determines the engagement operation during shifting of the higher gears by controlling the position of the actuating member according to a characteristic with which the actuating member is moved with a speed proportional to the engine speed. Such an operating characteristic shortens the engagement time as the rotating speed increases.

According to another aspect of the invention, the engagement process takes place independent of the engine speed and can thus be controlled via the gas pedal. The position of the clutch actuating member, for instance, the position of the clutch lever, is continuously set or adjusted in the slippage range in dependence upon the engine speed and the engagement position in which the clutch is completely engaged also occurs at an engine speed determined by the function generator. In some driving situations, for example, during starting on a hill or slight slope, the vehicle starts moving at low engine speeds with the gas pedal only slightly depressed. The engine power in such a case suffices for accelerating the vehicle. However, the engine speed does not attain the value necessary for complete engagement of the clutch. The clutch can therefore remain in the slippage range for an extended period of time. This leads to unnecessary wear of the clutch linings.

According to another aspect of the invention, one avoids driving situations in which the engine speed corresponding to the engagement position is not achieved, engagement of the clutch is still attained and lining wear resulting from clutch slippage is reduced, by having the control respond to the driving speed of the vehicle and shift the actuating member towards the engagement position as a function of time, independent of the engine speed responsive first function generator by a second engagement controlling function generator. The second function generator engages the clutch in dependence upon the driving speed but independently of the engine speed. Driving situations of the aforementioned kind in which the engine output is sufficient for slow acceleration without, however, the engine speed reaching that needed for the engagement position, cannot arise. As soon as the vehicle has reached the predetermined vehicle speed, the second function generator completely engages the clutch from the slippage range. The engagement takes place in dependence upon time to prevent jerky operation of the clutch.

According to yet another feature of the invention, the two function generators operate independently of one another, but can also function simultaneously. This has the substantial advantage that there need no longer be a distinction between the starting program and a separate shifting program for changing higher gears. If the vehicle speed is lower than the vehicle speed predetermined by the second function generator, then the first function generator determines the engagement operation. If the vehicle speed is higher than the predetermined value, as is the case during shifting of higher gears, then the engagement is time dependent. However, the drive of the clutch is not only controlled by the control signals of the second function generator, but also by the control signal of the first function generator which occur simultaneously. These signals, which preferably overlap one another, together determine the position of the actuating member or actuator. This has the advantage of shortening the engagement time of the clutch at high engine speeds and prevents racing of the engine during gear changes. According to an embodiment of the invention, if necessary, each gear of the transmission can be adapted for its own predetermined drive speed in the second function generator. However, preferably, only a single speed threshold is established above which the clutch is always engaged. This speed threshold lies at a speed achievable in the lowest gear of the vehicle. Preferably, it is in the range of the vehicle speed which is established at the engine speed coinciding with maximum engine torque in the lowest transmission gear. According to a feature of the invention, the predetermined driving speed is below this value.

In one preferred structurally simple, embodiment, the second function generator has a threshold stage which responds to signals which are proportional to the vehicle speed as well as a ramp circuit controllable by the threshold stage for producing a signal which changes with respect to time in an unchanging direction. The speed change of this signal determines the adjustment speed of the actuating member of the clutch. According to an embodiment of the invention, the ramp circuit is in the form of an integrator controlled by the threshold stage in which the integrator produces a linearly ascending signal. According to another embodiment of the invention, integrating resistor-capacitor networks, upon reaching a predetermined speed value, redirect the suddenly changing output signal of the threshold signal to form an exponentially changing signal.

A further situation leading to clutch lining wear can arise when an attempt is made to prevent the vehicle from rolling back on an upgrade, not by using the vehicle brake, but by having the clutch slip. On steep slopes, this can lead destruction of the clutch lining in a very short time. According to a feature of the invention, this is avoided by providing the control with yet a third engagement operating controlling function generator which sets the activating member into the engagement position as a function of time when the engine speed is above a predetermined speed during a predetermined time interval. The time interval preferably is chosen to depend upon the engine speed in order to keep the slippage time brief at high rotational speeds which cause a large amount of wear. At low rotational speeds, the time interval can, by contrast, be longer. The third function generator engages the clutch in dependence upon time, that is to say, gradually, so that the driver has a chance to let go of the gas pedal and operate the vehicle brake. If the driver maintains the gas pedal position, the engine speed decreases as the engagement of the clutch progresses, until such time as the engine speed dependent disengagement is attained and the clutch automatically disengages.

According to a simple embodiment, the third function generator is in the form of an integrator for a signal produced proportionally to the engine speed, the integration time constant of the signal being changeable by means of a stage which is responsive to the integrator output signal and which contains a component with non-linear characteristics. The non-linear component can, for example, be a Zener diode connected in series to the output of the integrator. This component establishes the predetermined time interval in dependence upon speed. After initiation of the engagement operation, the integrator output signal changes relatively slowly according to the irregularity of the non-linear component. The breakdown point of the characteristic is achieved more slowly at high engine speeds than at low engine speeds. After surpassing or exceeding the breakdown of the characteristic, the integrator output signal changes comparatively quickly and the clutch is engaged according to the rise of the integrator output signal.

During automatic operation of the clutch, the clutch must not only be disengaged during changing of the gears, but also in any driving situations which can lead to stalling of the motor. According to an aspect of the invention, disengagement is taken into account by the production of a number of control signals. A first appropriate disengagement condition is derived from initiation of the gear change which, according to an embodiment of the invention, is sensed with a split or divided gear lever that operates a switch contact. A second disengagement condition occurs when the engine speed drops below a predetermined value. However, the clutch can also be disengaged when the speed of the vehicle goes below the predetermined value when a forward gear higher than the first gear is engaged. This not only prevents starting in higher gears, but also stalling of the motor when the vehicle is braked when the gear is engaged. The aforementioned disengagement conditions are sufficient for normally occurring driving situations. Further disengagement conditions can still occur. For example, according to another embodiment of the invention, the clutch is disengaged in dependence upon the operation of an additional switch, preferably a hand switch. This achieves a free wheeling function which can be used for fuel savings. Disengagement of the clutch should take place only when the gas pedal is simultaneously in the rest position.

According to another feature of the invention, occurrence of disengagement conditions inhibits the control for engagement operation. In other words, this means that the disengagement operation takes precedence over the engagement operation. The engagement operation is preferably monitored so as to take place only in the absence of a disengagement condition.

The clutch displacement range between the disengagement position and the borderline position of the actuating member normally encompasses about two-thirds of the total operational displacement, whereas the slippage range is in the order of 20% to 40% of the total range. The range between the disengagement position and the boderline position should therefore be traversed as quickly as possible during engagement. According to an embodiment of the invention, a switch is provided for speed switching. This switch is operable in the borderline position by the actuating member.

According to another embodiment of the invention, such a switch is made unnecessary by providing the drive with a position control loop which regulates the actual position of the actuating member in dependence upon an intended position or command position or reference position set by the control in dependence upon the engine speed. The control serves as an intended value generator or reference generator or command generator. If the actuating member is situated in the range between the disengagement position and the borderline position, its position does not coincide with the intended position determined by the engine speed. Hence, the drive then moves at a maximum speed because of the maximum error signal until the command position corresponding to the engine speed is reached.

When the motor is at rest, the clutch is disengaged. When the starter is defective or some similar condition prevails, the motor can therefore not be started by pushing or pulling the vehicle. According to a preferred embodiment of the invention, the clutch is engaged with an auxiliary starting switch. If the clutch function is controlled exclusively through the auxiliary starting switch, this can lead to accidents when vehicles set themselves in motion suddenly and spontaneously. According to a preferred embodiment, the clutch is controlled not only in dependence upon the auxiliary starting switch, but also in dependence upon the gas pedal position and the engine speed. When the auxiliary starting switch is switched on, the clutch is engaged only upon operation of the gas pedal. As soon as the motor has started and exceeds a set speed threshold, the clutch is automatically disengaged. This method of functioning is achieved by logically combining control signals which are produced according to the gas pedal position, the position of the auxiliary starting switch, and the engine speed.

In the aforementioned clutch operating devices, the function generator of the control determines the position of the actuating member of the clutch in the slippage range of the clutch in dependence upon the engine speed. Here, the reference position is the position in which the torque transmission begins, and the function generator is balanced and/or the clutch is adjusted such that the error signal of the control, which signal corresponds to this position, coincides with the actual beginning of the torque transmission of the clutch. Since the position of the actuating member moves as the wear of the clutch linings increases, trouble can arise in the clutch operation.

In order to make the control, which controls the engagement operation of the drive, independent of the state of wear of the clutch, according to an aspect of the invention, by having a position generator produce a signal corresponding to the actual position of the actuating member is coupled to the drive, having the control increase its error signal to the drive control by a corrective or error signal increment from a storage circuit that stores the difference between two reference position signals stored therein, and by bringing the clutch into a position with a defined friction lock and entering this position from the position generator into the storage circuit for formation of one of the reference position signals.

Such a device measures the wear-dependent change of the regulating path of the actuating member of the clutch. The regulating signal of the control applied to the drive is accordingly increased in order to make up for this wear-dependent change in the regulating path. The first of the two reference position signals defines the position of the beginning of torque transmission with a correctly adjusted clutch. The second reference position signal measured by the position generator defines the position of the beginning of torque transmission with wear-dependent deviation. The reference position signal need not necessarily designate the position of the beginning of torque transmission. They can characterize any other position insofar as this position is at an unchanging, known distance relative to the position of the beginning of torque transmission. According to one embodiment the reference position is the engagement position in which the clutch is completely engaged. The storage circuit, depending on its construction, stores either the corrective signal increment (or error signal increment) or else the reference position signals. In the second case, the error signal increment must constantly be calculated anew. In the first case, it is calculated only at the time of measurement and then stored.

According to another embodiment of the invention, to determine the second reference position signal which indicates the wear, the clutch is brought into a position with defined friction lock. According to one embodiment, the position of the actuating member with a fully engaged clutch is determined. This embodiment is advantageous particularly in clutches wherein the clutch springs are dimensioned so large that they can fully engage the clutch against the resistance of the springs even when the drive is switched off.

According to another preferred embodiment, the position of the beginning of torque transmission is stored directly. A control circuit arrangement controls the drive device (drive) in a predetermined direction beyond the position of the beginning of torque transmission. The drive device has an electric motor, and a current sensor stage responds to the drive current change of the electric motor in the position of the beginning of torque transmission and controls the entering operation of the storage or memory circuit. The drive current change which arises suddenly according to the direction of the movement of the actuating member when the engine is stressed or released designates the position of the beginning or end of torque transmission and can be stored, for example, with the help of a threshold stage. According to a preferred aspect of the invention, in order to create clearly reproducible conditions, the control circuit, in response to a control signal, first moves the drive into the engagement position and, then, beyond the position of beginning of torque transmission into the disengagement position. According to one expedient, the drive is moved beyond the position assigned to the engagement position, so that the power transmission member, for example, the clutch cable or the like, are completely relieved. In order to eliminate errors arising from acceleration of the clutch members and the like, the position change speed during determination of the drive current change is chosen to be smaller than the position change speed in the driving operation of the vehicle, that is to say, during normal operation of the clutch via the control.

The clutch wear is normally extraordinarily slight. The stored reference position signals must therefore be made operational only after relatively long time intervals. According to an aspect of the invention, placing the reference position signals is accomplished by switching on of the ignition system of the vehicle via the ignition switch.

The corrective signal increment is a measure of the wear of the clutch.

According to a feature of the invention, a limit indicator responds to the error signal increment and the wear of the clutch is thus indicated without problems.

In the aforementioned embodiment, wherein the control is independent of the wear condition of the clutch, the motor current of the drive is monitored during disengagement for determining the position of the beginning of the torque transmission of the clutch.

A threshold stage measures the rise of the current when the clutch cable or clutch linkage, which is loose when the clutch is engaged, meets the resistance of the clutch spring. According to an embodiment of this invention, the current rise is used as an indicator for a reference position in which the clutch has a defined friction lock. The reference position is analyzed in the program control for equalization of wear-dependent position changes.

Measurement of the motor current generally requires a series resistor in the motor circuit. In some cases, this can lead to undesired performance reduction in the motor circuit. Spatial separation of the driver stage of the motor and the control electronics also require additional lines which increase fabricating costs.

To avoid these drawbacks, according to a feature of the invention, the necessary compensation is accomplished on the control electronic portion and not the motor current.

According to an embodiment of the invention, this is achieved by coupling to the drive, a position generator which produces a signal corresponding to the actual position of the actuating member (i.e., the clutch actuator), whereby the control increases the error signals to the drive with an error signal increment from a storage or memory circuit. The corrective or error signal increment corresponds to the difference of the two reference position signals stored in the memory circuit so that the clutch is drivable at a predetermined rate for performance which is reduced in relation to the rate for performance at normal clutch operation. The signal of the position generator is entered into the storage circuit for formation of one of the reference position signals when the time change of the signal of the position generator, which change corresponds to the time change of the actual position of the actuator is smaller than a predetermined value.

Such a device measures the wear related change of the regulating path of the clutch actuator. The error signals of the control which are applied to the drive that move the actuator of the clutch are accordingly increased in order to equalize this wear related regulating path change. The first of the two reference position signals defines the position of the beginning of the torque transmission or of another position arranged for a set degree of engagement. The second reference position signal, measured by the position generator, defines the position of the beginning of torque transmission or a position arranged for setting the degree of engagement during wear related deviation. The storage circuit, according to an embodiment of the invention, stores the error signal increment. According to another embodiment of the invention, the storage circuit stores the reference position signals. In the second case, the regulating signal or error signal increment is constantly calculated anew. In the first case, it is only calculated at the time of measurement and then stored.

The drive performance or rate of the drive is reduced during determination of the reference position to the extent that the drive stops when the actuator, for example, the clutch cable, encounters the resistance of the clutch spring. The signal of the position generator which changes during movement of the actuator remains constant when the drive is at a standstill. The disappearance of the time change of the signal of the position generator is evaluated as an indicator for the attainment of the reference position. The rate or drive performance of the drive is preferably reduced to the extent that only 20% to 30% of the torque mustered in the normal clutch operation is imparted. The absolute position in which the actuator remains stopped is without significance for the purpose used.

According to an embodiment of the invention, arranging the absolute position to a set engagement degree is taken into account via the characteristic of a function generator of the control. In order to achieve as high as possible an exactitude of periodicity, the reduced drive torque should, however, be measured so that the drive stops in a position in which the force to be exerted on the clutch increases as sharply as possible in dependence upon the position. In other words, the standstill position should be at the steepest portion of the power-path actuation characteristic of the clutch.

According to a feature of the invention, the standstill and/or quasi-standstill of the drive is obtained in the simplest manner with the help of a differentiating circuit, followed by a threshold circuit. In a preferred embodiment, capable of good reproduction of the established standstill position, a comparison stage compares the threshold value with a difference signal which corresponds to the difference of the signal of the position generator and a control signal which changes in time with constantly changing speed. This comparison stage interrupts the change of the control signal when the difference signal is smaller than the threshold signal. The time control circuit sets off the entry of the signal of the position generator into the storage circuit when the difference signal remains smaller than the initial signal during a predetermined time interval. The control signal follows the signal of the position generator at a predetermined time delay and the difference signal is a measurement of the increasing speed of the position generator signal. The time control circuit assures that momentary fluctuations of the difference signal do not influence the determination of the standstill position.

According to another feature of the invention, production of the control signal utilizes an integration circuit for integration of a signal which is constant in time. The integration circuit is controllable by the comparison stage. The integration circuit is constructed as an analog circuit similar to a conventional ramp signal generator. However, to avoid problems with time fluctuations of the signal, a preferred embodiment of the invention, utilizes an integrating circuit in the form of a counting circuit which counts constant frequency timing pulses passed through a gate controlled by the comparison stage. The time control can then be formed by a timing member which, each time, is triggered by pulses which are simultaneously applied to the counting circuit. The time constant of the timing member is greater than the time in which the timing pulses follow one another. Such a timing member, constructed in the manner of a subsequently triggerable monostable multivibrator is set off anew by each of the counting pulses. The standstill position is established after the last counting pulse, with a delay equal to the time constant of the timing element.

According to another feature of the invention, the value of the control signal, represented, for example, by the counting content of the aforementioned counter, represents a measurement of the wear of the clutch. Going beyond of the wear limit of the clutch is displayed acoustically or optically by means of a warning signal generator when the control signal exceeds a predetermined threshold value. As soon as the control signal is produced by means of a counter, the warning signal generator can be triggered via a predetermined counting output of the counter.

According to yet another feature of the invention, lowering the drive performance or the drive torque is achieved simply with an electric motor that serves as a drive device, with the driver circuit of the electromotor producing current pulses having predetermined constant duty cycles during the establishment of the reference position. The duty cycle is chosen according to the desired reduced torque.

These and other features of the invention are pointed out in the claims. Other objects and advantages of the invention will become evident from the following detailed description when read in light of the accompanying drawings.

DESCRIPTION OF PREFERRED EMBODIMENTS

Figure 1:
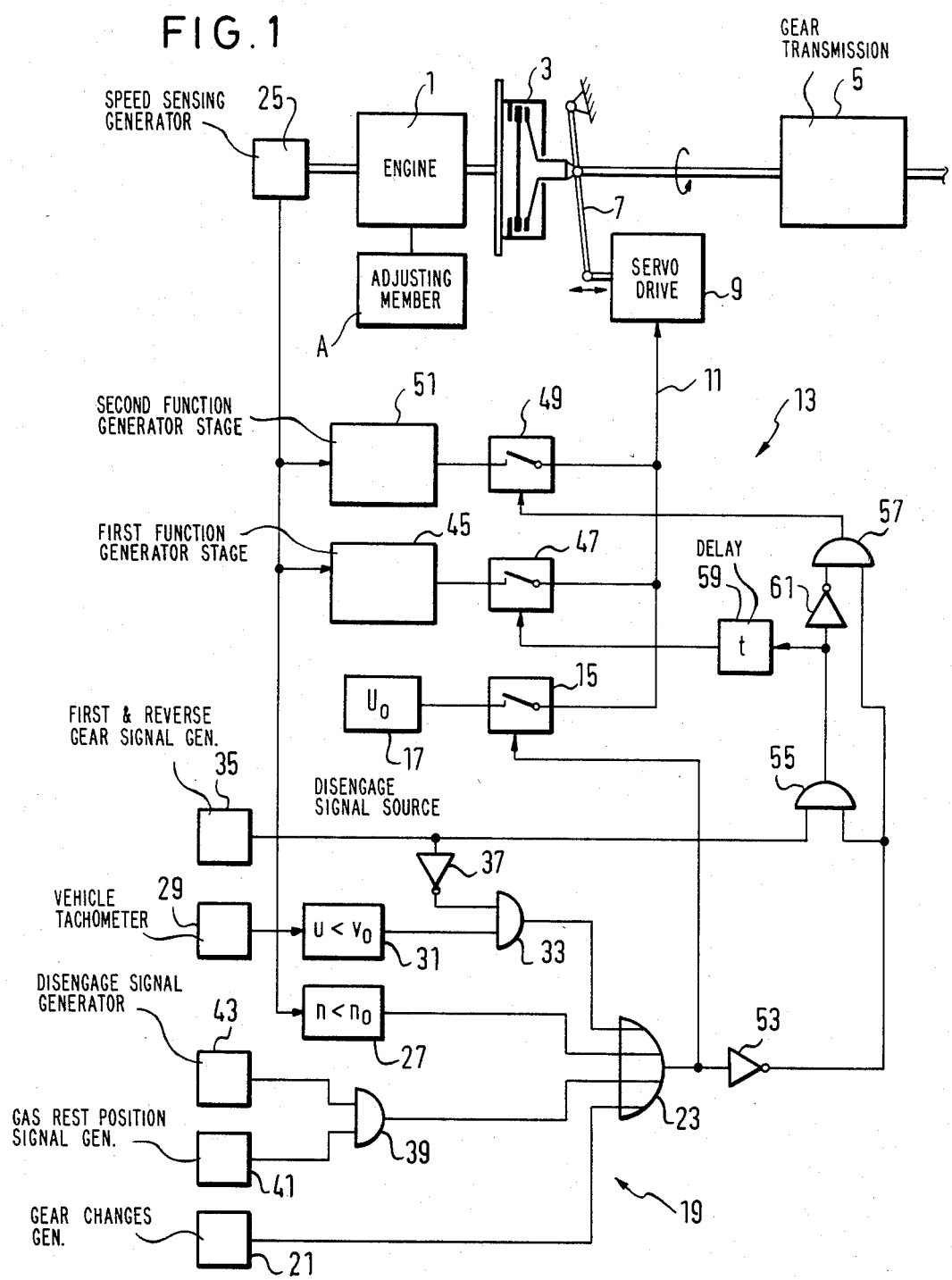
FIG. 1 is a block diagram of a motor clutch transmission unit of a motor vehicle with an automatic clutch operation device embodying features of the invention.

In FIG. 1, a motor vehicle engine or motor 1 utilizes a dry friction-disk clutch to drive a multi-gear transmission 5 whose gears are shifted with a hand shift lever (not shown) or a servo-control. In the clutch 3, which is conventionally constructed, springs whose details are not shown bias the clutch into engagement when an actuating member 7 is not operated. A servo-drive 9 connected to the actuating member 7 adjusts the actuating member from its actual position to an intended or desired position on the basis of an intended value or command signal appearing on a line 11 from a program control 13. For this purpose, the servo-drive responds to the actual position and includes an electromotor that is controlled on the basis of a comparison between the command value signal and an actual value signal.

To disengage the clutch, an electronic switch 15 applies an intended value or command value signal from a signal source 17 to the servo-drive 9. This moves the actuating member 7 to the left in FIG. 1, and, hence, into the disengaged position of the clutch 3. The controllable switch 15 is controlled by a disengagement control 19 that responds to any one of several disengagement conditions. Upon initiation of a gear change, a signal generator 21, which may, for example, be a switch contact at a split shift lever of the transmission 5, produces a first control signal which an OR gate 23 applies to the operating control input of the switch 15.

A second disengagement condition to which the disengagement control 19 can respond is derived by a speed sensing generator 25 which produces a signal proportional to the rotary speed of the engine 1, and applies the signal to a threshold stage 27 which, in turn, is connected to a second input of the OR gate 23. This second disengagement condition is fulfilled when the rotary speed n of the engine drops below a predetermined rotary speed $n_0$. The rotary speed $n_0$ is somewhat lower than the idling speed of the engine 1. When the idling speed is approximately 800 rpm, the speed $n_0$ is, for example, 650 rpm. This second disengagement condition assures disengagement when the vehicle is braked to a standstill.

Still another disengagement condition is provided to prevent starting in higher gears, for example, second, third, or fourth gear, and to prevent braking from stalling the motor when a higher gear is engaged. This condition is achieved during engagement of a higher gear when the driving speed of the vehicle drops below a predetermined value. A tachometer 29 senses the speed of the vehicle and emits a speed-proportional signal which appears at a threshold stage 31. The threshold stage 31 is connected to a first input of an AND gate 33 whose output is connected to a third input of the OR gate 23. A signal generator 35 which responds to the first or reverse gear being engaged, registers engagement of the higher gears through an inverter 37 at a second input of the AND gate 33. The inverted binary output signal of the signal generator 35 characterizes the use of higher gears.

A fourth input of the OR gate 23 receives the output of an AND gate 39 whose inputs are respectively connected to signal generators 41 and 43. The signal generator 41 responds to the rest position of the gas pedal of the vehicle, while the signal generator 43 constitutes a hand switch. The hand switch signal generator 43 can disengage the clutch 3 for allowing the vehicle to freewheel to save fuel when the gas pedal is in the rest position.

The engagement process is controlled in dependence upon the gear setting of the transmission 5. Control, while starting the vehicle, is accomplishd with the aid of a first function generator stage 45 whose output is connected, via a controllable electronic switch 47, to the signal line 11 of the servo-drive 9. The line 11 also receives signals through another electronically controllable switch 49 from a second function generator stage 51 which controls the engagement during a gear change while driving. The function generator stages 45 and 51 are connected with the speed sensing or tacho-generator 25 and control the position of the actuating member 7 in dependence upon the motor rotating speed.

The engagement commands of the function generator stages 45, 51 can only be performed when none of the disengagement conditions is fulfilled. The output of the OR gate 23 is connected via an inverter 52 with AND gates 55 and 57. The AND gate 55 controls the switch 47 via a time delay member 59 with predetermined time constant. A generator 35 at the second input of the gate 55 responds when the first gear or reverse gear is engaged. The AND gate 55 is high when the first gear or the reverse gear is engaged and none of the disengagement conditions is present. During starting, this occurs when a driver steps on the gas and the engine speed exceeds the rotary speed value $n_0$ established at the threshold stage 27. After the time of the time constant of the delay member 59 has elapsed, the switch 47 is closed and the clutch 3 is engaged according to the speed-dependent program of the function generator stage 45. If the gas pedal is stepped on slightly to start, then the engine speed increases only gradually, so that the clutch 3 begins to engage at essentially the rotational speed $n_0$ set by the threshold stage 27, despite the engagement delay caused by the time delay member 59. If one starts at full throttle, then the engine 1 can, during the time delay caused by the delay member 59, accelerate to a high rotating speed in the range of its maximum torque before the switch 47 is closed, to initiate the start operation.

The engagement operation during the shifting of higher gears is initiated when the conditions for the starting operation are not present and also none of the disengagement conditions exist. For this purpose, the AND gate 57 whose output controls the input of the switch 49, receives one of its inputs from the inverter 53 and its other input via an inverter 61 from the output of the AND gate 55.

Figure 2:
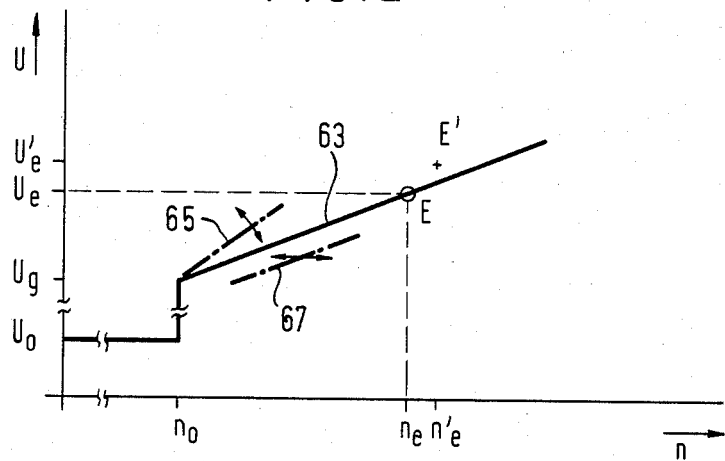
FIG. 2 is a block diagram of an output signal V of a control of the device in FIG. 1 as it depends upon the engine speed n.

FIG. 2 shows a diagram of the command signal V of the starting program in dependence upon the engine rotating speed n. The signal V determines the position of the actuating member 7 of the clutch 3 and is applied to the servo-drive 9 via the line 11. It encompasses substantially two signal ranges, the first of which determines the behavior below the borderline or threshold rotational speed $n_0$ determined by the threshold stage 27 (FIG. 1), and the second of which determines the behavior above this threshold speed. Below the borderline rotational speed, the command signal has the value $V_0$ of the signal source 17 (FIG. 1), that is to say, a value at which the servo-drive 9 completely disengages the clutch 3. The signal $V_0$ is constant in this range, so that the clutch 3 remains disengaged independently of rotational speed at rotating speeds lower than $n_0$.

In first or reverse gear, the clutch 3 is engaged according to the starting operation set by the function generator stage 45. The function generator stage 45 produces a command signal 63 which increases linearly with the rotational speed n, as shown in FIG. 2.

If the engine speed exceeds the borderline or threshold speed $n_0$, the switch 15 opens and cuts of the signal source 17 while closing of the switch 47 connects the function generator stage 45. The signal V now changes from the value $V_0$, which determines the disengagement position, to a value $V_g$. The value $V_g$ is chosen so that, in the static condition, at this value, the clutch 3 is just at the point where it does not yet transmit any torque or transmits only a torque which cannot yet set the vehicle in motion. The signal jump of the intended-value signal V from the value $V_0$ to the value $V_g$ produces an error signal which causes the servo-drive 9 to move the activating member 7 into the borderline position at maximum speed.

Above and adjacent the borderline position, is the slippage range of the clutch 3, in which the torque transmitted by the clutch 3 can be determined linearly in dependence upon the engine speed b, that is to say, by means of the gas pedal position. The slippage range extends between the borderline or threshold position determined by the borderline or threshold rotational speed $n_0$ and an engagement position E which is attained at an engagement rotating speed $n_e$. The term engagement position E means the position at which the clutch 3 just stops slipping. Above and adjacent the engagement rotating speed $n_e$, there is an engagement range in which the clutch remains completely engaged independently of the engine speed n and also independently of the magnitude of the command signal V.

In order to be able to adapt the rotational speed-dependent course of the command signal 63 of the function generator stage 45 to the borderline position as well as in view of the engagement position of the clutch, the slope as well as the rotational speed-proportional amplitude of the command signal curve can be changed with the function generator stage 45 to the dot-dash lines 65 and 67 in FIG. 2. This permits changing the value $V_e$ which is to be attained at the threshold rotational speed $n_o$, as well as the engagement point E, in view of the engagement speed $n_e$ as well as in view of the value $V_e$ of the command signal.

Figure 3:
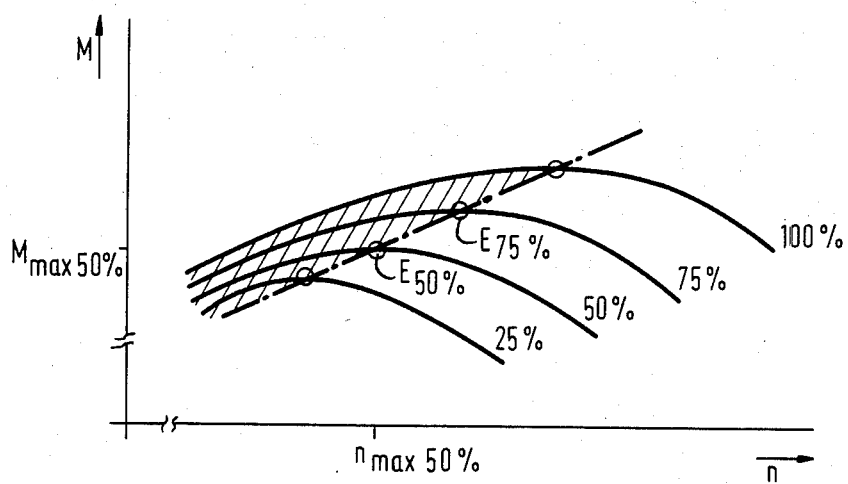
FIG. 3 is a graph illustrating the engine torque M as it depends upon the engine speed n.

In friction clutches, the engagement position E depends upon the motor torque which is to be transmitted. When a small motor torque is to be transmitted, a slight friction-lock suffices, while transmission of the maximum torque requires a higher friction-lock before the clutch no longer slips. The solid lines of FIG. 3 are curves of the engine torque M as it varies with the rotational speed n of the engine for different positions of a member determining the motor performance. According to various embodiments of the invention, this member is the gas pedal, the throttle valve position, or the regulating member of an injection pump. The full throttle position is designated 100%. Torque curves for intermediate throttle positions are indicated as 25%, 50%, and 75%. Each of the torque curves passes through a maximum at a different rotating speed n. For example, for the torque 50% curve, the rotating speed at which the torque maximum $M_{max}$ 50% appears, is indicated by $n_{max}$ 50%. The speed-dependent course of the command signal of the function generator stage 45 is controlled in dependence upon the member of the engine which determines the performance, such that the engagement position is always achieved at the rotational speed of the maximum torque. In FIG. 3, the engagement position $E_{50\%}$ occurs at the rotational speed $n_{max}$ 50%. The engagement position $E_{75\%}$ which is also indicated as an example, occurs at a higher rotating speed.

FIG. 2 shows the displacement of the engagement position during an increase of the engine power when applying gas. During increase of engine power, when applying gas, the engagement position E moves to higher rotating speeds as well as to values of the command signal V, at which the friction-lock of the clutch 3 is increased. Such an engagement position is indicated in FIG. 2 at E'. It appears at the engagement rotating speed $n'_e$ and a value $V'_e$ of the intended-value (command) signal.

Figure 4:
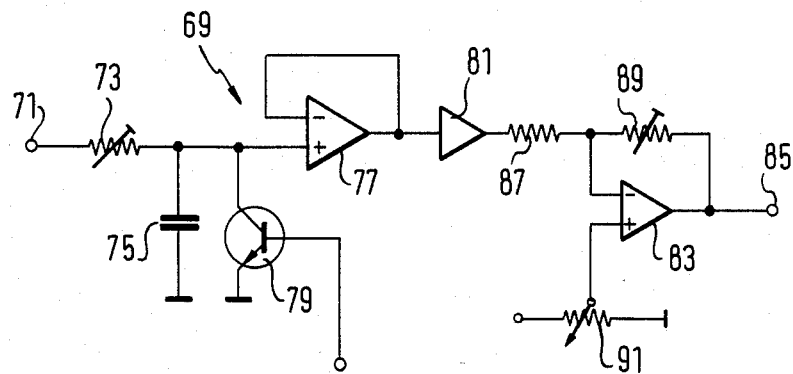
FIG. 4 is a schematic diagram of a function generator for a starting program in FIG. 1 and embodying features of the invention.

In FIG. 2, the characteristic of the command signal furnished by the function generator stage 45 exhibits a linear dependence on the engine speed. Depending on the desired engagement behavior, other curve forms can also be chosen. FIG. 4 shows a simple example of a function generator stage 45 producing a linear characteristic. The circuit includes an integrator 69 whose input 71 receives pulses which the rotating generator 25 delivers at a frequency proportional to the rotational speed. The signal at the input 71 appears at an integrating RC circuit composed of an adjustable resistor 73 connected in series with a capacitor 75. The output of the RC circuit, that is to say, the connecting point of the series resistor 73 and the capacitor 75, is connected with the non-inverting input of an operational amplifier 77, the inverting input of which is fed back from the output. Connected parallel to the capacitor 75 is the collector-emitter-path of a transistor 79 whose base is connected with the disengagement control 19. When a disengagement condition is present, the transistor 79 is turned on and briefly shunts the capacitor 75. If a disengagement condition is not present, the transistor 79 is non-conductive (off) so that the pulses of the rotary speed generator 25 can charge the capacitor 75. Whether the transistor 79 is on or off, the impedance between its collector and emitter determines the discharge time constant of the RC circuit and, thus, the voltage to which the capacitor 75 can charge in response to the rotational speed. An inverting amplifier 81 at the output of the operational amplifier 77 of the integrator 69 isolates a further operational amplifier 83 whose output 85 carries the intended-value or command signal. The output of the amplifier 81 is connected in the usual manner via an input resistor 87 to the inverting input of the operational amplifier 83. An adjustable resistor 89 feeds the output of the operational amplifier 83 back to the inverting input. The non-inverting input of the operational amplifier 83 is biased by a bias source in the form of an adjustable resistor 91. The time delay of the command signal is adjusted at the resistor 73. The resistor 89 permits the adjustment of the amplification of the amplifier 83 and, thus, of the slope of the rotating speed-dependent curve of the command signal while, the resistor 91 permits the adjustment of the zero-point position of the command curve.

The function generator stage 51 (FIG. 1) produces a time-related ascending command signal whose ascending rate is proportional to the engine speed. The engagement time of the clutch 3 is thus inversely proportional to the generator. The higher the engine speed, the higher the time-related ascending rate of the command signal and the smaller the time interval necessary for traversing the slippage region between the borderline or threshold position and the engagement position.

Figure 5:
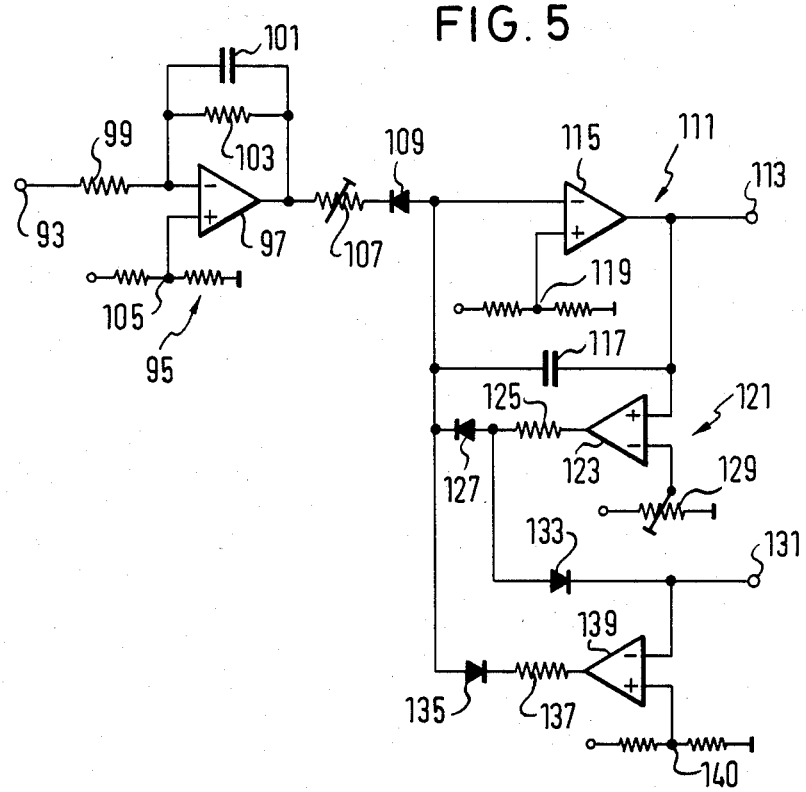
FIG. 5 is a schematic diagram of a function generator for a switching characteristic for shifting higher gears.

FIG. 5 shows details of the circuit of the function generator stage 51. An input 93 of a first integrator 95 receives pulses produced by the speed sensing generator 25 at a frequency proportional to the generator speed. The integrator 95 is constructed conventionally with an operational amplifier 97, an input resistor 99 from the input 93 and a parallel feedback circuit composed of a capacitor 101 and a resistor 103. The non-inverting input of the operational amplifier 97 is biased by a source 105 in the form of a voltage divider circuit. The integrator 95 delivers a signal proportional to the engine speed, which signal is conducted via an adjustable resistor 107 and an isolating diode 109 to a second integrator 111 whose output 113 emits the command signal controlling the servo-drive 9.

The integrator 111 integrates the output signal of the integrator 95 with respect to time, and, thus, produces a time-related ascending output signal, whose rate of increase is proportional to the output voltage of the integrator 95, that is to say, proportional to the engine speed. The integrator 111 includes an operational amplifier 115 whose inverting input receives the output signal of the integrator 95, and whose output is fed back via a capacitor 117. The non-inverting input of the operational amplifier 115 is biased by a source composed of a voltage divider circuit 119.

Connected parallel to the capacitor 117 is an adjustable discharge circuit 121 which includes an operational amplifier 123, the non-inverting input of which receives the output of the integrator 111 and the output of which is connected via a resistor 125 and a blocking or decoupling diode 127 to the inverting input of the operational amplifier 115. The inverting input of the operational amplifier 123 is biased by an adjustable source 129 in the form of a potentiometer.

A control input 131 connected via a blocking diode 133 to the diode 127 receives the signal from the disengagement control 19. When a disengagement condition is fulfilled, the signal at the control input 131 causes discharge of the capacitor 117 and simultaneously stops integration of the integrator 111. The inverting input of the operational amplifier 115 is moreover connected through a blocking or decoupling diode 135 and a series resistor 137 to the output of the operational amplifier 139, the inverting input of which is connected with the control terminal 131 and the non-inverting input of which is biased by a source 141 in the form of a voltage divider circuit.

The adjustable resistor 107 can adjust the increase rate of the output signal at the output 113. The engagement position can be varied by means of the adjustable resistor 129. The operational amplifier 139 controls the integrator 111 slightly in the charging direction. The operational amplifier 123 discharges the integrator 111 down to a borderline value which corresponds to the voltage adjusted at the slide of the adjustable resistor 129. The operational amplifier 139 thereat assures that the output voltage at the output 113 does not sink below the borderline value during discharge, but rater, is held at the borderline or threshold value. If the output voltages of the integrator 94 indicates an engine speed which is smaller than a predetermined speed, the output signal of the integrator 111 remains constant. If the engine speed drops below the predetermined speed during the engagement process, then the engagement process is interrupted before the clutch is completely engaged. The clutch remains in the slippage or slip range until the engine speed is once again increased by stepping on the gas.

The above operating device is suited not only for passenger cars but also for two wheel vehicles. Customarily, the motors of two wheel vehicles have their maximum torque only slightly below the top performance because of high yield per liter. With the help of the above device, one can start at low rotating speeds despite the low flywheel mass, without stalling the motor. Starting at high rotating speeds is also possible.

Figure 6:
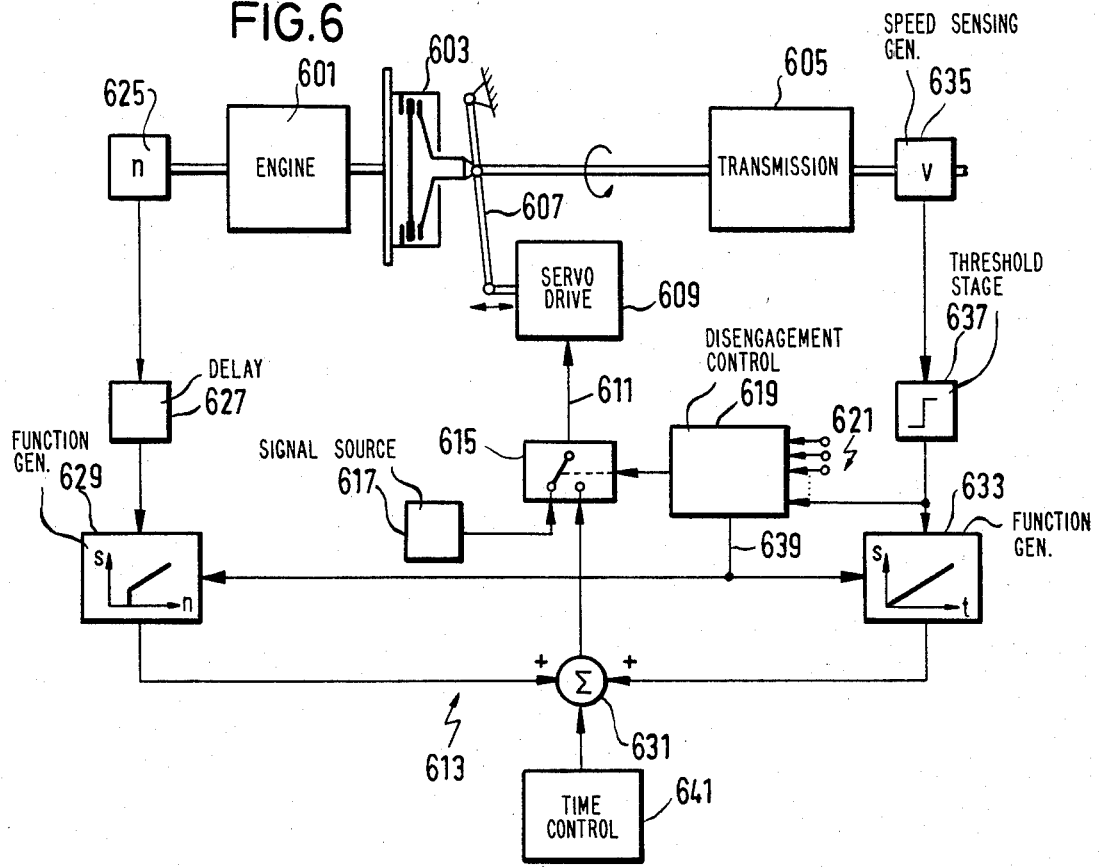
FIG. 6 is a block diagram of a motor clutch transmission unit of a motor vehicle with an automatic clutch operating device embodying features of the invention.

In the embodiment according to FIG. 6, an engine 601 of a vehicle drives a multi-gear transmission 605 through a dry friction disk clutch 603. The gears of the transmission are shifted by means of a manual shift lever (not shown) or a servo-control. The clutch 603 is constructed conventionally and spring biased so that it is engaged when the actuating member 607 is not operated. A servo-drive 609 coupled to the actuating member 607 sets the actual position of the actuating member 607 to an intended or command position according to a command signal applied through a line 611 by a program control 613. The servo-drive 609 includes an electromotor, the actual position of which responds to a command value actual-value comparison.

To disengage the clutch 603, a signal source 617 furnishes a command to the servo-drive 609 via an electronic, controllable selector switch 615. The servo-drive 609 moves the actuating member 607 to the left in FIG. 6 into the disengaged position of the clutch 603. The switch 615 is controlled by a disengagement control 619 which responds to several disengagement conditions, as elucidated in detail with respect to FIGS. 1 to 5. Corresponding signal generators are connected to inputs 121 of the disengagement control 619. If one of the disengagement conditions exists, the disengagement control 619 switches the selector switch 615 into its first position wherein it connects the signal source 617 with the line 611, so that the servodrive 609 completely disengages the clutch 603.

The engagement process is controlled in dependence upon the engine speed. A rotational speed sensor 625 imparts a speed-proportional signal to a first function generator stage 629 via a signal delay stage 627. The delay stage 627 corresponds functionwise to the timing member 59 of FIG. 1, while the first function generator stage 629 corresponds to the first function generator stage 45 according to FIG. 1. The output signal of the first function generator stage 629 changes depending on the engine speed, and is conducted via a summing stage 631 through the second contact of the switch 615 to the servo-drive 609. The disengagement control 619 switches the switch 615 into the second position when none of the disengagement conditions are fulfilled. The clutch 603 is thus engaged when gas is fed and thus when the motor rotating speed is increased according to the clutch path speed characteristic set by the first function generator stage 629.

The first function generator stage 629 effectively determines the position of the actuating member 607 during starting. In order to take into account the changed clutch conditions when the vehicle is in motion, the summing stage 631 also responds to the output signal of a second function generator stage 633. The second function generator stage 633 imparts a time-dependent regulating signal which is superimposed on the regulating signal of the first function generator stage 629. The second function generator stage 633 is set off in response to the speed of the vehicle. For this purpose, a rotational speed sensing generator 635 responds, in this embodiment, to the power take-off speed of the transmission 605. The sensing speed generator 635 actuates a threshold stage 637 and, hence, the engagement program of the second function generator stage 633 when the power take-off speed of the transmission 605, and, thus, the vehicle speed, is above a predetermined value.

In this manner, the clutch 603 is completely engaged even when the engine rotating speed is insufficient to cause the clutch to completely engage, for example, at a low driving speed and with the high gear engaged. The threshold of the threshold stage 637 is chosen to set off the second function generator stage at a vehicle speed such as is attained in the lowest gear of the vehicle. The threshold is preferably chosen in such a way that the corresponding engine speed at the lowest gear is equal to or smaller than the engine speed at maximum torque.

According to an embodiment of the invention, the second function generator stage 633 is constructed as an integrating stage which is reset together with the first function generator stage 629 during disengagement via the disengagement control 619 along line 139. According to another embodiment, resistor capacitor integrating networks delay the output of the threshold stage and produce an exponentially changing signal. The output signal of the threshold stage 637 forms a sudden step upon its input exceeding its threshold value. According to another embodiment of the invention, the threshold is set at a vehicle speed of 15 km/h.

During the process of shifting to the higher gears, the clutch 603 is mainly controlled on a time-dependent basis by the second function generator stage 633. However, the first function generator stage 629 also remains functional during the shifting of the higher gears. Thus, these gears shift in response to an additional rotational speed dependent component. This increases the engagement rate at high rotational speeds and prevents racing of the motor during gear changes. Situations can arise in which the engine speed is in a range in which the first function generator stage 629 has already moved the clutch 603 into the slippage area, but the vehicle speed does not attain the value determined by the threshold stage 637. This may, for example, occur when an operator prevents the vehicle from rolling back on an upgrade not by using the vehicle's brake, but by applying the gas with a slipping clutch. At high engine speeds in particular, this can quickly destroy the clutch linings. To prevent this, a time control 641 engages the clutch 603 on a time-dependent basis when the engine speed is above a predetermined rotational speed for a given time period. The time control 641 also imparts a corrective signal to the summing stage 631 for this purpose. The time interval affer which the time control 641 engages the clutch 603 is preferably dependent upon the engine speed. The higher the engine speed, the shorter should be the time interval, in order to prevent lining damage with certainty. After the time control 641 has been set off, the clutch is gradually engaged so that the driver can reduce the engine speed by letting go of the gas pedal. If the driver does not reduce the engine rotating speed, then the engine is braked because of the increasing clutch engagement, until the engine speed-dependent disengagement condition of the disengagement control 619 is fulfilled and the clutch 603 disengages automatically.

Figure 7:
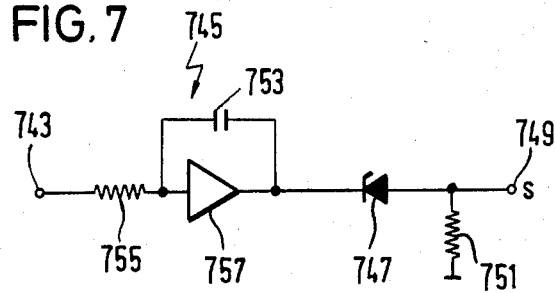
FIG. 7 is a stage usable in the clutch operating device according to FIG. 6 for engaging the clutch with a longer slippage operation of the clutch.

FIG. 7 is a circuit diagram illustrating the time control 641. The engine speed proportional signal of the speed sensing generator 625 appears at an input 743 of an integrator 745. A Zener diode 747 applies the summing input of the summing stage 631 through a terminal 749 to the output of the integrator 745. If the output of the generator 625 varies in frequency with the engine speed, a frequency voltage converter is incorporated therein to produce a voltage that varies with speed. An output resistor 751 forms a current path to the Zener diode 747 so that the integration time constant, which is determined by a feedback capacitor 753 and an input resistor 755 of an amplifier 757 of the integrator 755, depends on the non-linear characteristic of the Zener diode 747. The integration time constant is large for small values of the output signal and rises suddenly as soon as the Zener breakdown (threshold) voltage of the Zener diode has been attained. The higher the engine speed, the faster the characteristic point, i.e., Zener breakdown voltage, determined by the Zener diode 747 is reached. Since the output signal produced by the summing stage 731 changes only a little until the initiation of the Zener breakdown of the Zener diode 747, the clutch 603 remains in the slippage area during this time interval. After initiation of the breakdown in the Zener diode 747, the corrective signal applied to the summing stage 731 changes comparatively quickly, so that the clutch 603 gradually engages.

Figure 8:
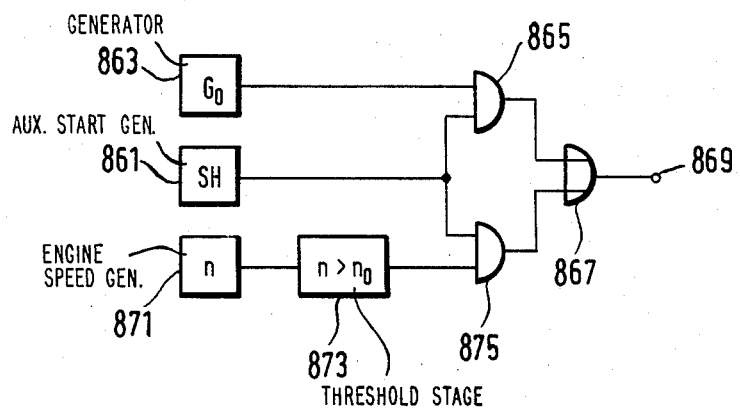
FIG. 8 is a block and logic diagram illustrating an auxiliary starting usable in the clutch activating device shown in FIG. 1 and embodying features of the invention.

FIG. 8 shows the circuit diagram of a stage of the disengagement control 619 which permits the starting of the engine by means of towing or pushing of the vehicle. Since the disengagement control 19, described with respect to FIGS. 1 to 5, always disengages below a predetermined engine speed $n_0$, the starting of the engine by pushing would not be possible without additional measures. A simple disabling circuit of this disengagement condition, for instance, with the help of a switch, could lead to uncontrollable driving situations when the engine starts. The circuit according to FIG. 8, upon activation of an auxiliary start switch 861, makes certain that the vehicle can be towed with a gear engaged, for example, with the second gear engaged, but with the clutch 603 engaging only upon operation of the gas pedal. As soon as the motor 601 starts and exceeds the predetermined rotating speed $n_0$, the clutch 603 automatically disengages again. For this purpose, an AND gate 865 receives the outputs of the auxiliary starting switch 861 which, upon activation, emits a "1" or high signal, and a generator 863 which emits a "1" or high signal in the rest position of the gas pedal. The AND gate 865 produces, via an OR gate 867, a "1" signal which characterizes the disengagement condition. This signal switches the selector switch 615 into the first position in which the signal generator 617 is connected with the servo-drive 609. The output of an engine speed generator 871, which registers the engine speed appears at a threshold stage 873 which emits a "1" signal when the engine speed increases beyond the rotational speed limit $n_0$ upon starting the engine. The threshold stage 873 together with the auxiliary starting switch 861 operate and AND gate 875 whose output is applied to the OR gate 867 as well.

The circuit according to FIG. 8 fulfills the disengagement condition when the auxiliary starting switch 861 is switched on even while the engine is at a standstill, as long as the gas pedal is not operated. The selector switch 615 is switched into the second position which engages the clutch 603, as soon as the gas pedal is operated when the motor is at a standstill. If the engine starts, then the disengagement function is again fulfilled independently of the gas pedal position. Not represented in FIG. 8 is a stage which fulfills the disengagement condition with auxiliary starting switch 861 off, when the motor rotating speed drops below the threshold $n_0$.

Figure 9:
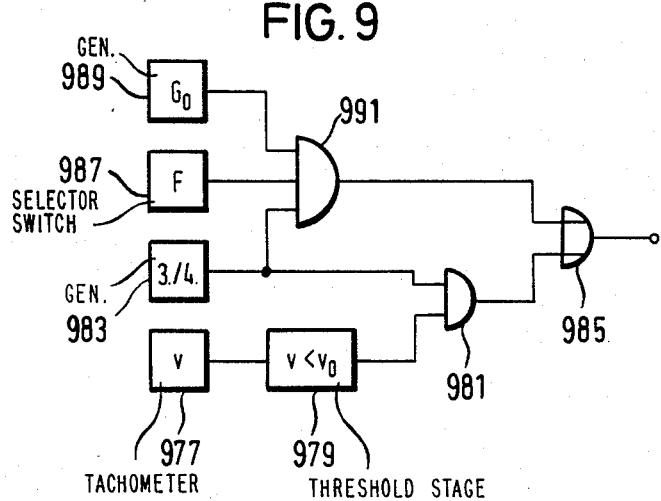
FIG. 9 is a block and logic diagram of a disengagement control usable in the device of FIG. 6 which embodies features of the invention.

FIG. 9 shows a logic circuit for furnishing the disengagement conditions for the disengagement control 619 as well as the disengagement control 19 of the earlier embodiment. In order to prevent starting in third or fourth gear, a tachometer 977 registers the speed of the vehicle. A threshold stage 979 imparts a "1" signal to an AND gate 981 when the vehicle speed is below a predetermined value. When the third or fourth gear of the transmission is engaged, a generator imparts a "1" signal to the AND gate 981 which, in turn, is connected via an OR gate 985 to the selector switch 615. The disengagement condition is fulfilled if, with the third and fourth gear engaged, the driving speed sinks below the predetermined value. Furthermore, the freewheeling function, already elucidated with respect to FIGS. 1 to 5, in which the clutch can be disengaged by means of a freewheeling selection switch 987, when the gas pedal is in the rest position, is expanded to the extent that the freewheeling function can be switched on only in the third or fourth gear. This measure goes far towards preventing uncontrollable driving situations that can arise, for example, at low gears such as in city traffic, in particular. The generator 983, the freewheeling selection switch 987 as well as a generator 989 responding to the rest position of the gas pedal are, for this purpose, connected to an AND gate 991 which, in turn, is connected with the OR gate 985.

Figure 10:
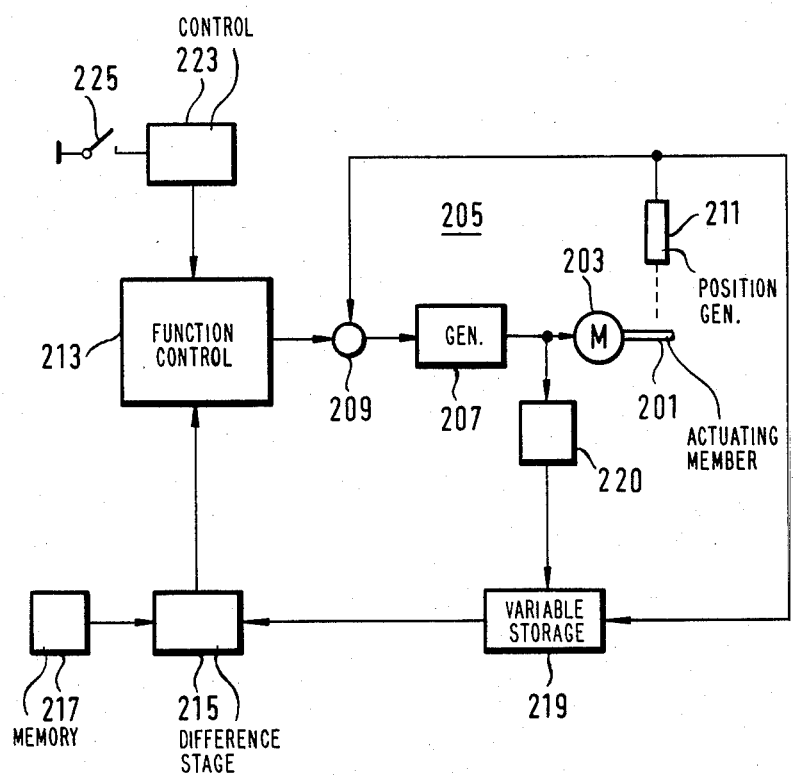
FIG. 10 is a block diagram of an electrical device for automatic operation of a motor vehicle friction clutch in which the clutch wear is automatically considered.
Figure 11:
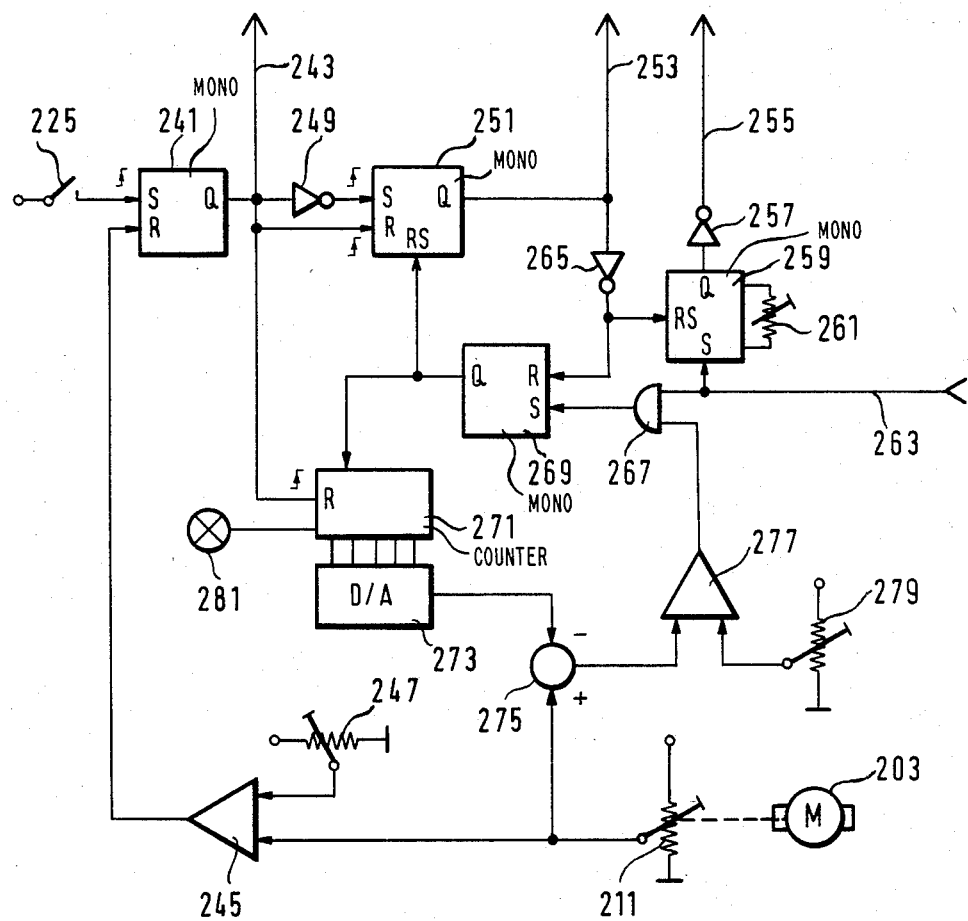
FIG. 11 illustrates a block diagram of a control stage for obtaining the operating position of a clutch while the coupling actuation degree remains the same, which stage embodies features of the invention and is usable with other embodiments of the present invention.
Figure 12:
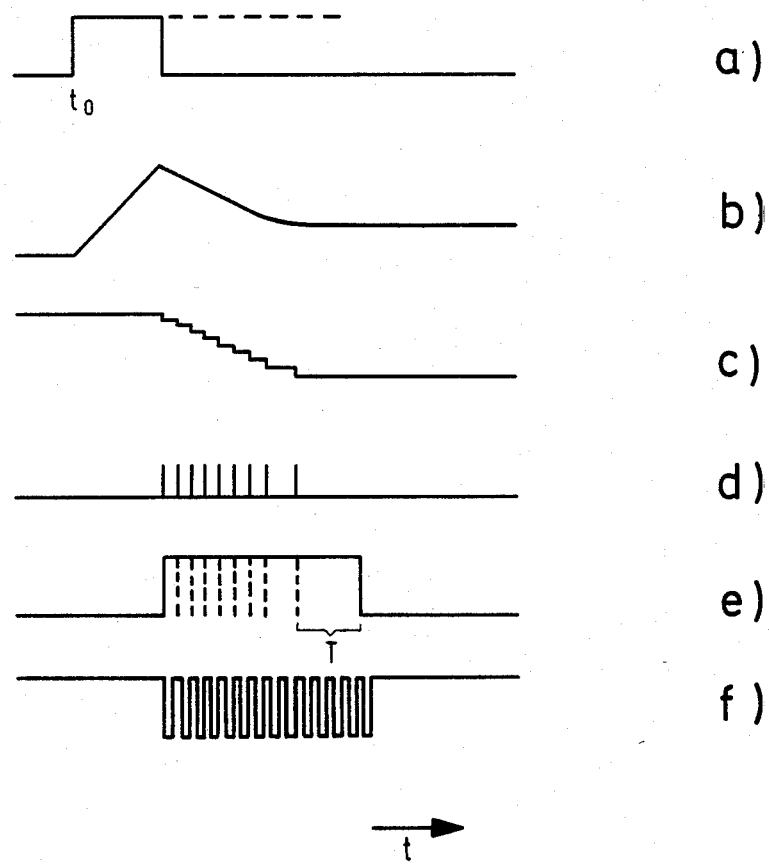
FIG. 12, graphs A to F, show time diagrams of signals such as they appear at various circuit points in the circuit according to FIG. 11.

FIGS. 10–12 illustrate arrangements for automatic compensation of the effects of clutch lining wear on the program control. An activating member 201 of a motor vehicle friction clutch, no represented in detail, is coupled by an electric motor 203 which engages or disengages the clutch via its actuating member 201. The electric motor 203 is connected in a control loop and receives drive current signals from a generator 207 which, in turn, is controlled by the error signals from a comparator 209. In the usual manner, the comparator 209 produces the error signals from actual position signals of a position generator 211 which measures the position of the actuating member 201 and of a program function control 213, the details of which were already described with reference to the program or function control elucidated in FIGS. 1 and 6. The control 213 controls the disengagement operation and engagement operation of the clutch. In the engagement operation, the control 213 imparts intended value or command signals which contol the electric motor 203, and, thus, the position of the actuating member 201, according to a set program dependent upon the engine speed of the vehicle. The position of the actuating member 201 is controlled to cause operation substantially in the slippage region of the clutch, that is to say, between a position at the beginning of torque transmission and at a position in which the clutch is completely engaged. The clutch must be engaged so that the actuating member 201 assumes a position at which torque transmission begins and which coincides with the intended value or command signal of the program control 213. This command signal is assigned to corrrespond to this position.

Because this coincidence between signal and torque transmission changes as clutch wear increases, a difference stage or differential amplifier 215 adds a position increment signal to the command signal in the program control. The position increment signal corresponds to the wear-dependent path change of the actuating member with respect to the original adjustment of the clutch. The difference stage 215 forms the position increment signal as the difference between a reference position signal assigned to the original position and stored in a first memory 217 and a second reference position signal stored in a second variable storage 219. The storage 219 stores the actual position of the position generator 211 in the position of the start of torque transmission of the clutch or another position with a defined, reproducible degree of engagement of the clutch. This position is stored by means of a sensor circuit 220 which responds to the time change of the position signal of the position generator 211. The sensor circuit 220 controls the write-in operation of the memory or storage 219.

In order to create reproducible conditions despite the play of the clutch linkage or the like, a write-in control 223 is operated by the vehicle's ignition switch. When the ignition switch is switched on, the control 223 actuates the electric motor 203 via a program control 213. Specifically, the control 223 first switches the electric motor 203 to move in the direction of engagement, and then, into the direction of disengagement. In the engagement direction, the electric motor 203 is moved away from the fully engaged position of the activating member 201 so that the clutch linkage comes completely loose.

During subsequent movement in the disengagement direction, the write-in or write control 223 reduces the power take off torque of the electric motor 203 to a value which is not sufficient for complete disengagement. The electric motor 203 remains at a standstill at a position at which the actuating member 201 corresponds to the position-dependent sharpest rise of the clutch operating force. The sensor stage 220 frees the write-in operation of the memory 219 when the time change of the position signal of the position generator 211 drops below a predetermined threshold value.

FIG. 11 illustrates details of the sensor circuit 220 and the write-in control 223 as well as other elements of FIG. 10. Here, the write control 223 first switches the electric motor 203 into the engaging direction when the ignition switch 225 is turned on. For this purpose, the ignition switch 225 connected to the set input S of a monostable multivibrator 241 sets the one-shot at a time $t_0$. A control line 243 connects the output Q of the monostable multivibrator 241 to the program control 213 to produce an intended value signal or command signal which forces the electric motor 203 to turn in the engaging direction during the set status of the one-shot 241 as shown in curve a of FIG. 12. A comparator 245 compares the position signal of the position generator 211 with a reference position generator 247 to terminate the engaging movement of the electric motor 203. The comparator 245 resets the monostable multivibrator 241 when the engagement position set at the reference position generator 247 is attained by the motor M as determined by the generator 211. The time constant of the monostable multivibrator is sufficiently long so that the reference position is attained before the set time of the flip-flop lapses.

An inverter 249 connects the output Q of the monostable multivibrator 241 with the set terminal S of a monostable multivibrator 251 and directly to the reset input terminal of the monostable multivibrator. The leading edge of the output signal of the monostable multivibrator 241 resets the monostable multivibrator or one-shot 251 while the trailing edge sets the latter. A control line 253 at the output Q of the monostable multivibrator 251 imparts a control signal to the program control 213 which thereupon forces the electric motor 203 to move in the disengaging direction. The trailing edge of the control signal imparted via the control line 253 (as shown in FIG. 12, graph e) designates the reference position to be written into the memory or storage 219 as described in more detail below.

During movement of the electric motor 203, its driver stage (not shown) is controlled by means of pulses as shown in FIG. 12, graph f through a line 255. The line 255 receives its signal through an inverter 257 at the Q output of the monostable multivibrator 259. The time constant of the latter which determines the width of the output pulses, and thus, the torque of the electric motor 203, is adjustable by a variable member 261. The monostable multivibrator 259 is triggered by timing pulses which a line 263 applies to the input S of the one-shot 259. Preferably, the line 263 comes from the control 213. The pulse width, and thus, the torque of the electric motor 203 is measured so that the electric motor stands still when stressed by the resistance of the clutch spring. The torque is approximately 20 to 30% of the torque produced in the normal operation of the clutch. An inverter 265 applies the inverted output of the monostable multivibrator 251 to a restart input R of the monostable multivibrator 259. Thus, the monostable multivibrator 259 can impart pulses to the driver circuit of the electric motor 203 only during the set duration of the monostable multivibrator 251.

An AND gate 267, when actuated, applies the timing pulses of the line 263 to the set input of a monostable multivibrator 269. The reset of the latter multivibrator receives signals through the inverter 265 for adjustment of predetermined beginning conditions. The monostable multivibrator 269 has a comparatively short time constant. Thus, its output produces counting pulses which is counted by a counter 271 during the set duration of the monostable multivibrator 251. The reset of the counter 271 is connected to the output Q of the monostable multivibrator 241 and is thus set to a predetermined counting content during the setting of the monostable multivibrator 241. It, therefore, counts the pulses of the monostable multivibrator 269. The counter 271 delivers output signals to a digital-to-analog converter 273 which produces an output that varies in steps with the number of pulses as shown in graph c of FIG. 12. The step shaped analog output signal of the digital-to-analog converter 273 is subtracted from the position signal of the position generator 211 and shown in FIG. 12, graph b by means of a difference circuit 275. A comparator 277 compares the difference signal with a reference signal of a reference signal generator 279 and closes the AND gate 267 to timing pulses when the difference signal drops below the reference signal. The pulse rate of the pulses applied to the counter 271 as shown in FIG. 12, graph d is a measurement of the speed of change of the position of the position generator 211 as shown in FIG. 12, graph b.

As long as counting pulses appear, the speed of change is above the threshold set by the reference signal generator 279. If the threshold is undercut, then the AND gate 267 blocks production of further counting pulses. The counting pulses are, moreover, applied to a restart input RS of the monostable multivibrator 251 which, as indicated by means of broken lines in FIG. 12, graph e, is set anew with each counting pulse. The monostable multivibrator 251 is reset when its time constant T ends after the last counting pulse and switches off the disengagement operation of the program control 213 via the control line 253. At the same time, as mentioned, the memory 219 is freed for write-in of the reference signal position of the reference signal generator 211 upon appearance of the trailing edge of the output signal of the monostable multivibrator 251. The content of the counter 271 is a measurement of the wear condition of the clutch. A warning device 281 connected to a predetermined counting output of the counter 271, for example, a signal lamp, shows overstepping of the wear limit of the clutch, or excessive wear.

Figure 13:
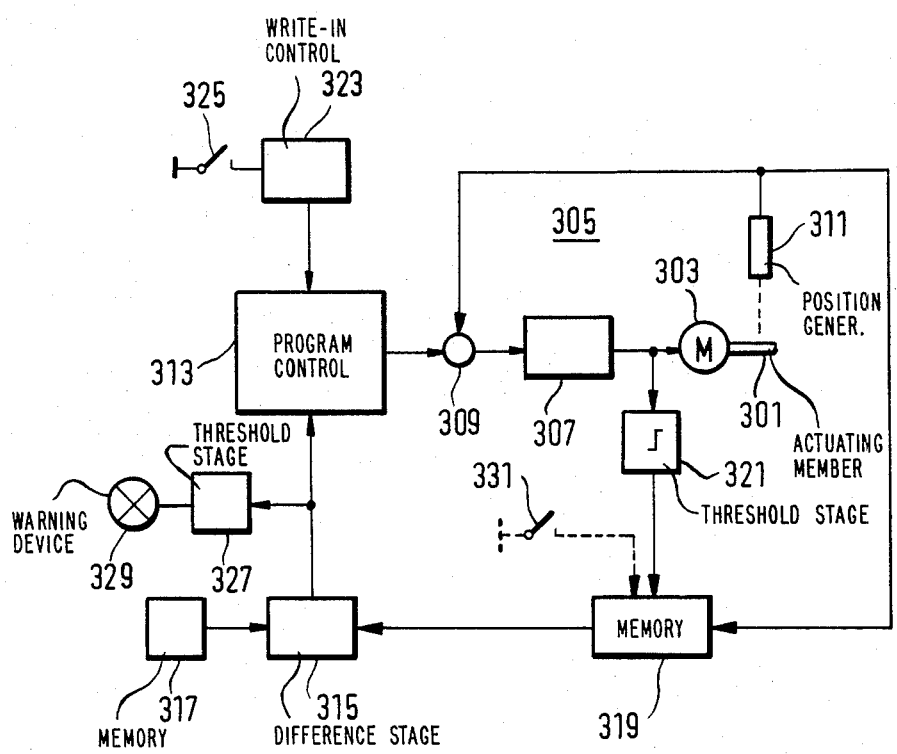
FIG. 13 is a block diagram of still another embodiment of an electrical device for automatic operation of a motor vehicle friction clutch in which the clutch wear is automatically considered and used, and embodying features of the invention.

FIG. 13 illustrates a circuit diagram of another embodiment serving for compensation of the effective wear on the program control. A motor vehicle friction clutch, not shown in detail, is controlled by an electric motor 303 which engages or disengages the clutch via the actuating member 301. The electric motor 303 is connected in a control loop 305 and receives drive current signals from a regulator 307 which, in turn, is controlled by an error signal from a comparator 309. The comparator 309 operates conventionally and produces error signals from actual position signals furnished by a position generator 311 which measures the position of a program control 313 of the above-described kind. The program control 313 conrols the engaging and disengaging operation of the clutch. In the engaging operation, the program control 313 produces intended value signals or command signals or reference signals which control the electric motor 303, and thus, the position of the actuating member 301 according to a preset program that depends upon the vehicle's engine speed. The position of the actuating member 301 is program controlled substantially in the slippage region of the clutch. That is to say, in the region between the position at which torque transmission begins and at the position in which the clutch is completely engaged. The clutch must be adjusted so that the position of the actuating member 301 at which torque transmission begins, corresponds with the intended value signal of the program control 313, which signal is assigned to this position. Since this coincidence changes as the wear of the clutch increases, a position increment signal from a different stage 315 affects the program control 313. The signal from the difference stage is added in the control program to the respective command signal. The position increment signal corresponds to the wear-dependent path change of the actuating member 301 with reference to the original adjustment of the clutch. The difference stage 315 forms the position increment signal as the difference of a reference position signal assigned to the original position and stored in a first memory 317, and a second reference position stored in a second variable memory 319. The storage 319 stores the actual position signal of the position generator 311 at the position at which torque transmission of the clutch begins. This position is registered by a threshold stage 321 that responds to the drive current change of the electric motor 303 at the beginning the friction-lock of the clutch. The threshold stage 321 controls the write-in operation of the memory 319.

In order to create reproducible conditions despite the play of the clutch linkage and the like, a write-in control 323 responds to the ignition switch 325 of the vehicle and, upon the ignition switch being turned on, switches the electric motor 303, through the program control 313, first into the engaging direction and then into the disengaging direction. In the engaging direction, the electric motor 303 moves beyond the fully engaged position of the actuating member 301 so that the clutch linkage comes completely loose. The threshold stage 321 responds to the drive current change during subsequent movement into the disengaging direction. This results when the electric motor 303 meets the resistance of the clutch springs after compensating for play.

The position increment signal is a measurement of the wear of the clutch. A threshold stage 327 connected to the output of the difference stage 315 can indicate the wear limit of the clutch via a warning device 329.

In the aforementioned embodiment, the storage or memory 319 stores a signal assigned to the position at which torque transmission begins. As long as the clutch springs are sufficiently strong to completely engage the clutch against the resistance of the motor 303 when the system is switched off, the position at which the clutch is completely engaged can be used as a reference position. In this case, the write-in operation in the memory 319 can be controlled directly via the ignition switch as shown at 331. The components 321 and 323 can be left out under these circumstances.

While embodiments of the invention have been described in detail, it will be evident to those skilled in the art that the invention may be embodied otherwise without departing from its spirit and scope.

What is claimed is:

1. For a motor vehicle having an engine and a friction clutch driven by the engine, a device for actuation of the friction clutch, comprising:

an actuation element for said clutch;

a positioning servo drive means for moving said actuating member between a disengagement position in which the clutch is disengaged and a full engagement position in which the clutch is completely engaged and through an adustable slippage range of engagement positions between a threshold position at the start of torque conversion and the full engagement position;

a speed sensor means for producing a speed signal corresponding to the positioning of the engine;

a position control means for controlling the operation of said drive;

a function generator means for said position control means for generating a predetermined speed-position characteristic between the engine speed and the engagement position;

characterized in:

the position control means being arranged to adjust said actuation member in the slippage range between said threshold position and said full engagement position in response to the speed of the engine according to a characteristic set by the function generator means such that for each engine speed there is a unique position of the actuating members.

2. For a motor vehicle driven by a combustion engine an apparatus for the automatic actuation of a friction clutch comprising:

(a) a positioning servo drive means responsive to a position control signal for adjusting the position of the friction clutch said drive being movable in response to said position control signal between a disengaging position in which the clutch is completely disengaged and a fully engaging position in which the clutch is completely engaged and through a slippage region of engagement positions starting at a threshold position at the beginning of torque transmission, (b) a speed sensor means for producing a speed signal corresponding to the speed of the combustion engine, (c) a position control means including a control signal generator for fixing a predetermined characteristic relationship between the speed signal and the position control signal, said position control being arranged for producing the position control signal in the slippage region between the threshold position at the beginning of torque transmission and a fully engaging position corresponding to the predetermined characteristic relationship in dependence on the speed signal such that for each speed signal there is a unique position control signal.

3. A device as in claim 2, wherein the engine includes an adjustment member for varying the engine torque and the position control includes means for varying the relationship between the engagement position and the engine speed in dependence upon the adjustment of the adjusting member which influences the engine torque.

4. A device as in claim 3, wherein the slippage region of engagement positions of the drive means are set in dependence upon the adjustment of the adjustment member substantially to the engine speed at which the maximum motor torque for the adjustment of the adjustment member occurs.

5. A device as in claim 2, wherein said position control includes means for adjusting said drive to the position determined by said function generator with a predetermined time delay.

6. A device as in claim 5, further comprising:

a threshold stage responsive to the engine speed for starting movement through the slippage region of engagement positions of said drive means upon the engine speed exceeding a predetermined speed threshold value; and a delay means for delaying the beginning of the movement of said drive means through the engagement positions a predetermined time after the drive reaches the threshold position.

7. A device as in claim 2, wherein said motor vehicle includes a multi-geared transmission having variable gear settings, said position control means being responsive to the gear setting of the multi-geared transmission, and the drive means is arranged to adjust the clutch in dependence upon the gear setting of the transmission.

8. A device as in claim 7, further comprising a function generator including a first function producer and a second function producer and wherein said position control means controls the position of said drive means in response to the first function producer when the transmission is set to first gear and reverse gear, and according to the second function producer when the transmission is set to other gears.

9. A device as in claim 8, wherein said second function producer produces a function wherein the time related positional change of the clutch is to be substantially proportional to the engine speed, and wherein said position control means responds to said second function producer by setting the drive means in the slippage region when the second function producer is operated.

10. A device as in claim 2, wherein said position control means is arranged to cause said drive means to change the position of the clutch substantially proportional to the engine speed when the clutch starts entry into the slippage region.

11. A device as in claim 1, wherein the function generator includes a first function producer responsive to the engine speed and a second function producer responsive to the gear speeds, and wherein above a predetermined engine speed, said control means causes said drive means to adjust the engagement operation of the activating element toward the full engagement position in response to the second function producer as a function of time and independent of the engine speed responsive first function producer.

12. A device as in claim 11, wherein the predetermined engine speed is smaller than the drive speed established at the lowest gear of the transmission during an engine speed set for maximum engine torque.

13. A device as in claim 11, wherein the second function producer includes a threshold stage responsive to engine speed proportional signals, and a ramp signal stage controllable by said threshold stage for producing a signal which varies along a slope with respect to time.

14. A device as in claim 13, wherein said ramp signal stage includes an integrating resistor-capacitor network.

15. A device as in claim 11, wherein said control means includes a third function producer for causing said drive means to adjust said actuating element into the engagement position as a function of time when the engine speed is about a predetermined speed during a predetermined time interval.

16. For a motor vehicle having an engine and a friction clutch driven by the engine, a device for actuation of the friction clutch, comprising:
an actuation element for said clutch;
a positioning servo drive means for moving said actuating member between a disengagement position in which the clutch is disengaged and a full engagement position in which the clutch is completely engaged and through an adjustable slippage range of engagement positions between a threshold position at the start of torque conversion and the full engagement position;
a speed sensor means for producing a speed signal corresponding to the positioning of the engine;
a position control means for controlling the operation of said drive means;
a function generator means for said position control for generating a predetermined speed-position characteristic between the engine speed and the engagement position;
characterized in:
the position control means being arranged to adjust said actuation member in the slippage range between said threshold position and said full engagement position in response to the speed of the engine according to a characteristic set by the function generator engine means as a function of the engine speed;
the function generating means including a first function producer responsive to the engine speed and a second function producer responsive to the gear speeds, and above a predetermined engine speed, said control means causing said drive to adjust the engagement operation of the actuating member toward the full engagement position in response to the second function producer as a function of time and independent of the engine speed responsive first function producer;
said first and second function producers being arranged to produce correction signals superimposed on one another for determining the position of the clutch.

17. For a motor vehicle driven by a combustion engine an apparatus for the automatic actuation of a friction clutch comprising:
(a) a positioning servo drive responsive means to a position control signal for adjusting the position of the friction clutch, said drive means being movable in response to said position control signal between a disengaging position in which the clutch is completely disengaged and a fully engaging position in which the clutch is completely engaged and through a slippage region of engagement positions starting at a threshold position at the beginning of torque transmission,
(b) a speed sensor for producing a speed signal corresponding to the speed of the combustion engine,
(c) a position control means including a control signal generator for fixing a predetermined characteristic relationship between the speed signal and the position control signal, said position control means being arranged for producing the position control signal in the slippage region between the threshold position at the beginning of torque transmission and a fully engaging position corresponding to the predetermined characteristic relationship in dependence on the speed signal, said motor vehicle including a multi-gear transmission with a first gear and a reverse gear as well as high forward gears, a motor control member, speed indicating means for producing a signal indicating vehicle operating speed, a manual switch, an engine control member, and further comprising disengagement control means for producing a first control signal upon initiation for a gear change in the multiple gear transmission; a second control signal when forward gears higher than the first gear are engaged; a third signal upon operation of said manual switch, a fourth control signal when said engine control member is in the rest position, a fifth control signal when the engine speed drops below a predetermined value; and a sixth control signal when the vehicle speed drops below a predetermined value; said disengagement control means being arranged for switching the drive means into the disengagement direction when the first control signal occurs or when the fifth control signal occurs or when the third and fourth control signals occur together or when the second and sixth control signals occur together, said first control signal, said fifth control signal, said third and fourth signals occurring together, and said second and sixth control signals occurring together, each representing a disengagement condition.

18. A device as in claim 17, wherein said disengagement control means inhibits said position control from causing said drive to move the clutch into an engagement position during disengagement of the clutch.

19. A device as in claim 18, wherein said vehicle produces a seventh control signal when the first or reverse gear is engaged, and said position control means is arranged to respond to the second control signal or the seventh control signal by causing said drive means to move the clutch to initiate engagement.

20. A device as in claim 19, wherein said disengagment control means includes an inverter responsive to the seventh control signal for producing the second control signal.

21. A device as in claim 19, wherein said position control includes a threshold detector for producing an eighth control signal when the engine speed exceeds a predetermined speed, and said control is arranged to cause said drive to start to move said actuator to start an engagement operation in response to simultaneous occurrence of said seventh and eighth control signals.

22. A device for automatically operating a friction clutch of a motor vehicle driven by a combustion engine and capable of moving from a disengaged position to a plurality of slippage positions and a completely engaged position, comprising:
  (a) positioning serve drive means for detecting the position of the clutch and adjusting the clutch in response to a position control signal;
  (b) rotational speed transmitter means for generating a rotational speed signal corresponding to the rotational speed of the combustion engine; and
  (c) position control means for forming said position control signal in response to the rotational speed signal in accordance with a preselected characteristic relationship such that for each rotational speed signal there is a unique position control signal.

* * * * *